(12) United States Patent
Hori et al.

(10) Patent No.: US 12,420,532 B2
(45) Date of Patent: Sep. 23, 2025

(54) ELECTROPHOTOGRAPHIC MEMBER AND ELECTROPHOTOGRAPHIC IMAGE FORMING APPARATUS

(71) Applicant: CANON KABUSHIKI KAISHA, Tokyo (JP)

(72) Inventors: Atsushi Hori, Chiba (JP); Haruki Mori, Chiba (JP); Shota Inoue, Ibaraki (JP); Kaoru Okamoto, Chiba (JP); Masayuki Onuma, Chiba (JP); Yusuke Baba, Kanagawa (JP); Takeshi Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/584,040

(22) Filed: Feb. 22, 2024

(65) Prior Publication Data
US 2024/0302770 A1    Sep. 12, 2024

(30) Foreign Application Priority Data
Mar. 3, 2023    (JP) ................. 2023-032913

(51) Int. Cl.
*B32B 25/20*    (2006.01)
*B32B 7/02*    (2019.01)
(Continued)

(52) U.S. Cl.
CPC .............. *B32B 25/20* (2013.01); *B32B 7/02* (2013.01); *B32B 25/042* (2013.01); *B32B 25/14* (2013.01);
(Continued)

(58) Field of Classification Search
CPC ......... B32B 25/20; B32B 7/02; B32B 25/042; B32B 25/14; B32B 2250/03; B32B 2250/248; B32B 2307/536
(Continued)

(56) References Cited

U.S. PATENT DOCUMENTS 8,871,307 B2    10/2014   Suzuki
9,594,318 B2    3/2017    Nakata
(Continued)

FOREIGN PATENT DOCUMENTS

JP    2005-250455 A    9/2005
JP    2017-68034 A    4/2017
(Continued)

OTHER PUBLICATIONS

U.S. Appl. No. 18/410,380, Chisato Murata, filed Jan. 11, 2024.

*Primary Examiner* — Betelhem Shewareged
(74) *Attorney, Agent, or Firm* — VENABLE LLP

(57) ABSTRACT

An electrophotographic member comprising: a base material; an elastic layer on the base material; and a surface layer on the elastic layer, wherein the elastic layer comprises silicone rubber, the surface layer comprises fluoro rubber, a thickness of the surface layer is 3 μm or more, an elastic deformation power ηIT calculated from a load displacement curve, obtained with a nanoindentation test according to ISO 14577 by bringing a Vickers indenter into contact with an outer surface of the surface layer and setting a test load at 120 μN, is 30 to 50%, and a Martens hardness determined by the nanoindentation test at the outer surface of the surface layer is 12.0 to 18.0 N/mm².

10 Claims, 6 Drawing Sheets

(51) Int. Cl.
*B32B 25/04* (2006.01)
*B32B 25/14* (2006.01)

(52) U.S. Cl.
CPC ..... *B32B 2250/03* (2013.01); *B32B 2250/248* (2013.01); *B32B 2307/536* (2013.01)

(58) Field of Classification Search
USPC ...................................... 428/195.1
See application file for complete search history.

(56) References Cited

U.S. PATENT DOCUMENTS

| | | |
|---|---|---|
| 10,042,272 B2 | 8/2018 | Mori |
| 10,120,331 B2 | 11/2018 | Nakata |
| 10,310,395 B2 | 6/2019 | Nakata |
| 10,365,569 B2 | 7/2019 | Tokimitsu |
| 10,451,984 B2 | 10/2019 | Mori |
| 10,488,769 B2 | 11/2019 | Nakata |
| 10,488,771 B2 | 11/2019 | Mori |
| 10,558,132 B2 | 2/2020 | Ishiduka |
| 10,558,133 B2 | 2/2020 | Nakamura |
| 10,670,979 B2 | 6/2020 | Nakata |
| 10,761,442 B2 | 9/2020 | Nakata |
| 10,768,539 B2 | 9/2020 | Mori |
| 10,768,557 B2 | 9/2020 | Okamoto |
| 10,831,118 B2 | 11/2020 | Watanabe |
| 10,969,703 B2 | 4/2021 | Takeuchi |
| 10,976,677 B2 | 4/2021 | Tokimitsu |
| 11,029,615 B2 | 6/2021 | Mitsui |
| 11,029,616 B2 | 6/2021 | Kujirai |
| 11,169,453 B2 | 11/2021 | Takeuchi |
| 11,204,560 B2 | 12/2021 | Tokimitsu |
| 11,237,494 B2 | 2/2022 | Mori |
| 11,556,082 B2 | 1/2023 | Tsuruga |
| 11,815,849 B2 | 11/2023 | Mori |
| 2003/0058320 A1* | 3/2003 | Sano ............... B41J 11/002 347/103 |
| 2005/0196196 A1 | 9/2005 | Ota |
| 2021/0341859 A1 | 11/2021 | Kameyama |
| 2022/0334506 A1 | 10/2022 | Takenaga |
| 2024/0302770 A1* | 9/2024 | Hori ............... G03G 15/162 |

FOREIGN PATENT DOCUMENTS

| | | |
|---|---|---|
| JP | 2021-108790 A | 8/2021 |
| JP | 2021-177235 A | 11/2021 |
| WO | 2023/064000 A1 | 4/2023 |

* cited by examiner

ELECTROPHOTOGRAPHIC MEMBER AND ELECTROPHOTOGRAPHIC IMAGE FORMING APPARATUS

BACKGROUND OF THE INVENTION

Field of the Invention

The present disclosure relates to an electrophotographic member that can be used for, for example, an intermediate transfer member in an electrophotographic image forming apparatus such as a copier or a printer, and relates to an electrophotographic image forming apparatus.

Description of the Related Art

With an electrophotographic image forming apparatus (which will be hereinafter also referred to as an "image forming apparatus"), a tandem system has been widely adopted in which toner images of respective colors of yellow (Y), magenta (M), cyan (C), and black (K) are superimposed on an intermediate transfer belt, and then, are transferred collectively onto paper, thereby obtaining a full-color image.

For such an image forming apparatus, in order to further enhance the image quality, an intermediate transfer belt (which will be hereinafter referred to as an elastic intermediate transfer belt) having an elastic layer for at least one layer of a layer configuration may be adopted in place of an intermediate transfer belt using a resin. The elastic intermediate transfer belt has a flexible elastic layer. For this reason, the pressure to act on the toner at the transfer part can be reduced, which is effective for preventing the "so-called void phenomenon". Further, the elastic intermediate transfer belt is excellent in followability to the surface of paper at the secondary transfer part (which will be also hereinafter referred to as the "medium followability"). Accordingly, the elastic intermediate transfer belt is also effective for the improvement of the secondary transferability of the toner image onto heavy paper or paper having unevenness.

The elastic intermediate transfer belt may have a surface layer for protecting the elastic layer from abrasion on the elastic layer. For this reason, the surface layer has preferably higher hardness than the elastic layer. However, when the hardness of the surface layer is too high, for example, the excellent followability to the surface of paper, i.e., the advantage of the elastic intermediate transfer belt, may be impaired. Japanese Patent Application Publication No. 2017-068034 discloses a member for electrophotography having an elastic layer including silicone rubber as a binder, and a surface layer on the elastic layer, in which the surface layer includes fluoro rubber having high flexibility.

SUMMARY OF THE INVENTION

According to the study by the present inventors, it has been recognized that an elastic intermediate transfer belt having a surface layer including fluoro rubber may be inferior in toner releasability while being excellent in medium followability.

At least one aspect of the present disclosure is for providing an electrophotographic member excellent in toner releasability while keeping the excellent medium followability. At least one aspect of the present disclosure is for providing an electrophotographic image forming apparatus capable of forming a high-quality electrophotographic image.

According to at least one aspect of the present disclosure, there is provided an electrophotographic member comprising:
a base material;
an elastic layer on the base material; and
a surface layer on the elastic layer, wherein
the elastic layer comprises silicone rubber,
the surface layer comprises fluoro rubber,
a thickness of the surface layer is 3 μm or more,
an elastic deformation power ηIT calculated from a load displacement curve, obtained with a nanoindentation test according to ISO 14577 by bringing a Vickers indenter into contact with an outer surface of the surface layer and setting a test load at 120 μN, is 30 to 50%, and
a Martens hardness determined by the nanoindentation test at the outer surface of the surface layer is 12.0 to 18.0 N/mm².

According to at least one aspect of the present disclosure, there is provided an electrophotographic image forming apparatus comprising the above electrophotographic member.

At least one aspect of the present disclosure can provide an electrophotographic member excellent in toner releasability while keeping the excellent medium followability. At least one aspect of the present disclosure can provide an electrophotographic image forming apparatus capable of forming a high-quality electrophotographic image.

Further features of the present invention will become apparent from the following description of exemplary embodiments with reference to the attached drawings.

DESCRIPTION OF THE EMBODIMENTS

In the present disclosure, unless otherwise specified, the descriptions of "from XX to YY" and "XX to YY" that represent numerical ranges mean numerical ranges that include the lower and upper limits that are endpoints. Moreover, when a numerical range is described stepwise, the upper limit and lower limit of each numerical range can be combined arbitrarily.

Below, embodiments of the present disclosure will be described in details. Incidentally, the present disclosure is not limited to the following description.

Figure 2:
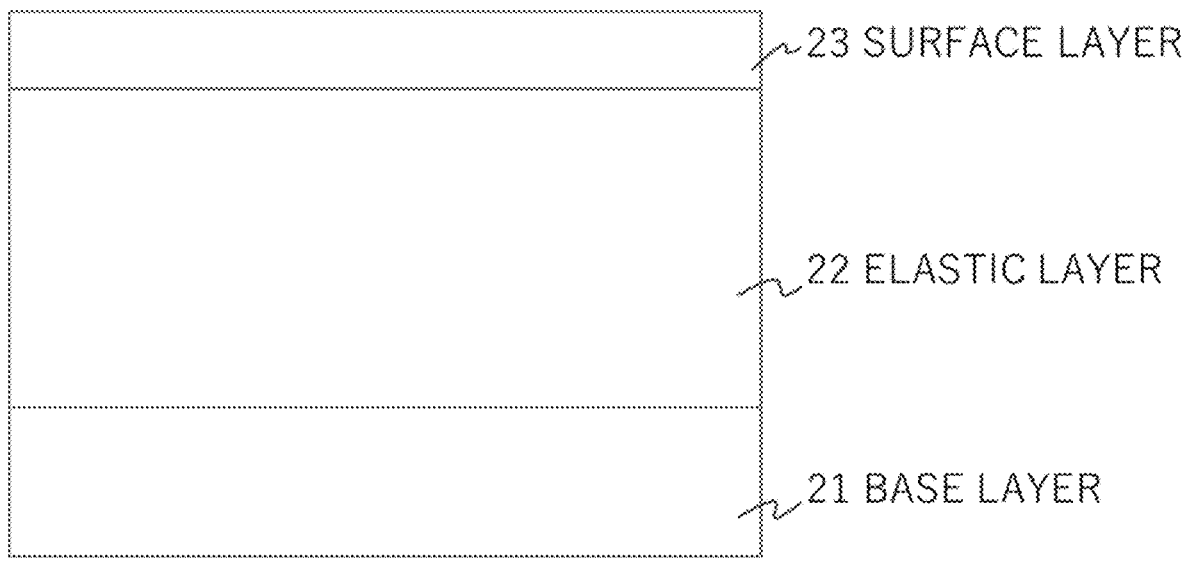
FIG. 2 is a cross sectional view showing a layer structure of an electrophotographic member.

An electrophotographic member of the present embodiment is a laminated body having at least three layers of a base layer 21, an elastic layer 22, and a surface layer 23 in this order as shown in FIG. 2. Namely, the electrophotographic member has a base material, an elastic layer on the base material, and a surface layer on the elastic layer. However, not limited to the three layers, a primer layer for improving the adhesiveness between respective layers, and an intermediate layer for suppressing the bleeding product from the elastic layer 22 may be added. The electrophotographic member may have an endless belt shape. For example, the surface layer forms the outer surface of the electrophotographic member. The electrophotographic member is preferably an intermediate transfer member. Below, a description will be given by taking the intermediate transfer member as an example of the electrophotographic member.

Base Layer

The base layer (base material) 21 will be described. The base layer 21 is, for example, of a seamless type cylindrical model in a roll shape or a belt shape. Examples of the material suitable for the base layer 21 may include resin materials such as polyether ether ketone, polyethylene terephthalate, polybutylene naphthalate, polyester, polyimide, polyamide, polyamideimide, polyacetal, polyphenylene sulfide, and polyvinylidene fluoride. The base layer preferably includes polyimide.

Incidentally, the resin for the base layer 21 may be added with a conductive compound such as a metal powder, a conductive oxide powder, conductive carbon, a lithium salt, or an ion liquid, to be imparted with the electric conductivity. From the viewpoints of the productivity and the electric conductivity, for example, for the base layer 21, polyvinylidene fluoride added with polyalkylene glycol and a lithium salt may be used. A combination of other resins and conductive agents shown may be used.

The thickness of the base layer 21 is preferably 10 to 500 µm, and more preferably 50 to 200 µm. A thickness of 10 µm or more is preferable from the viewpoint of the mechanical strength. A thickness of 500 µm or less can provide preferable rigidity.

Elastic Layer

The elastic layer 22 will be described. The elastic layer 22 is required to have proper flexibility in order to follow the surface profile of the recording medium. As the materials having such flexibility, mention may be made of rubber materials and elastomer materials such as silicone rubber, urethane rubber, acrylic rubber, olefin elastomer, styrene elastomer, polyamide elastomer, polyester elastomer, and polyurethane elastomer.

The elastic layer 22 of the electrophotographic member such as the intermediate transfer member in accordance with one aspect of the present disclosure preferably includes silicone rubber. The elastic layer 22 may be a cured product of an addition curable liquid silicone rubber mixture. Silicone rubber can be controlled on the hardness of the elastic layer according to the crosslinking density. In order to impart higher flexibility, the hardness can be lowered by reducing the crosslinking density. Further, silicone rubber is the material having the highest shape stability of the materials shown, and can keep the stable shape even during transport or in a pressurized state for a long time. The elastic layer 22 includes silicone rubber, so that favorable medium followability can be attained, resulting in the improvement of the image density uniformity.

Incidentally, the elastic layer 22 may be added with a conductive agent such as a metal powder, a conductive oxide powder, conductive carbon, a lithium salt, or an ion liquid, thereby to be imparted with the electric conductivity. For example, a conductive agent may be added to an addition curable liquid silicone rubber mixture. For example, silicone rubber having a small compression set (JISK 6262) also in the low hardness region is preferable. In addition to silicone rubber \, other resins and conductive agents shown may be used.

The thickness of the elastic layer 22 is preferably 100 µm to 1000 µm, more preferably 200 µm to 450 µm, and further preferably 200 µm to 300 µm.

The larger the thickness of the elastic layer is, the higher the medium followability is. For this reason, the thickness is preferably equal to or larger than the lower limit. This is due to the following: the deformation amount of the elastic layer is determined by (strain×thickness); for this reason, the larger the thickness is, the larger the deformation amount upon applying a given strain is. On the other hand, from the viewpoint of attaining a lower cost within the range capable of providing more favorable medium followability, the thickness is preferably equal to, or lower than the upper limit. The thickness falling within the range more improves the medium followability, and tends to provide favorable image density uniformity.

Further, the micro rubber hardness upon measuring the elastic layer 22 by a press needle of type C is preferably 70 to 85°, and preferably 73 to 82°. A smaller hardness of the elastic layer results in higher medium followability. For this reason, the hardness preferably falls within the range. Further, the range is preferable in view of the shape stability necessary for the intermediate transfer member.

The micro rubber hardness of the elastic layer can be controlled by changing the crosslinking density according to the amount of the crosslinking agent to be added, or the like. In the present disclosure, the micro rubber hardness is measured using a micro rubber hardness meter (MD-1 type C, manufactured by KOBUNSHI KEIKI CO., LTD., temperature 23° C., relative humidity 40%). The measurement is performed from the elastic layer surface side. The arithmetic average value upon measuring given 9 points is adopted as the value of the micro rubber hardness.

The conductive agent formulation with respect to the elastic layer 22 is preferably 10 parts by mass or less for every 100 parts by mas of a binder such as a rubber material or an elastomer material from the viewpoint of the mechanical strength. As a result of this, stable conductivity suitable for the intermediate transfer member is imparted to the elastic layer 22.

Further, the elastic layer 22 may additionally include additives such as a filler, a crosslinking agent (a crosslinking promoter, a crosslinking retardant, or a crosslinking auxiliary), a scorch retarder, an antioxidant, a softener, a heat stabilizer, a flame retardant, a flame retardant auxiliary, an ultraviolet absorber, and a rust inhibitor. As the crosslinking agent, silicone polymer having an active hydrogen group bonded with silicon only at the side chain is preferable.

For example, the elastic layer 22 is a cured product of an addition curable liquid silicone rubber mixture including a conductive agent, a hydrosilylation catalyst, and a crosslinking agent.

The intermediate transfer member is required to be flame-retardant for passage of a current at the transfer part. The elastic layer 22 may include a flame retardant. The flame retardants include a metal hydroxide such as magnesium hydroxide or aluminum hydroxide using the endothermic action, a platinum compound or a phenol type compound for suppressing the thermal decomposition, and an intumescent type compound, and a phosphoric acid ester condensation type compound having an oxygen blocking effect.

Further, the elastic layer 22 may include a reinforcing filler such as fumed silica, crystalline silica, wet silica, a fumed titanium oxide, or a cellulose nanofiber.

The method for manufacturing an elastic layer has no particular restriction. For example, the layer of an addition curable liquid silicone rubber mixture is formed on the outer surface of the substrate with a known method, and the liquid silicone rubber in the layer is cured. Examples of the curing method may include a heating method. The conditions for heating may be appropriately set according to the silicone rubber material to be used, and have no particular restriction. Examples thereof may include 0.5 to 300 minutes at 100 to 250° C. Heating may be performed at a plurality of stages by changing the temperature.

Further, a primer layer (not shown) may be provided between the base layer 21 and the elastic layer 22, if required, in order to improve the adhesion. The thickness of the primer layer is preferably from 0.1 µm to 2 µm from the viewpoint of reducing the cohesive failure in the primer layer.

Further, in order to improve the adhesion of the surface layer, the surface of the elastic layer may be surface treated with a known method such as excimer UV.

Surface Layer

Then, the surface layer 23 will be described. The surface layer 23 includes fluoro rubber. The surface layer including fluoro rubber is excellent in flexibility, and hence can provide an elastic intermediate transfer belt excellent in medium followability. Further, the surface layer including fluoro rubber has a low surface energy, and hence can have sufficiently low frictionability without depending upon a filler, and the like. For this reason, cracks are less likely to be caused. Further, the surface layer including fluoro rubber is low in gas permeability, and hence can better block bleeding from the elastic layer.

The surface layer including fluoro rubber is excellent in flexibility as described above, resulting in the improvement of the medium followability of the electrophotographic member including the surface layer. However, according to the study by the present inventors, the toner releasability of the surface of the surface layer tends to be reduced with an increase in flexibility of fluoro rubber.

The present inventors conducted a study in order to combine the excellent medium followability and the excellent toner releasability in the electrophotographic member having an elastic layer and a surface layer including fluoro rubber on the elastic layer at a higher level. As a result, the present inventors found that the foregoing problem can be solved by setting the elastic deformation power ηIT calculated from the load displacement curve obtained by the nanoindentation test of the surface layer at 30 to 50%, and the Martens hardness at 12.0 to 18.0 N/mm$^2$.

Specifically, the elastic deformation power ηIT calculated from the load displacement curve obtained by the nanoindentation test based on ISO14577 by bringing a Vickers indenter into contact with the outer surface of the surface layer, and setting the test load at 120 µN is 30 to 50%. Further, the Martens hardness determined by the nanoindentation test at the outer surface of the surface layer is 12.0 to 18.0 N/mm$^2$.

As at least one experimental example, the measurement results of the nanoindentation test of the fluoro rubber (after curing) formed of 3 kinds of fluoro rubber compositions varied in the amount of the curing agent relative to that of the fluoro rubber raw material are shown in Table 1.

TABLE 1

| Amount of curing agent to be added for every 100 parts by mass of basis | 3 | 7 | 14 |
|---|---|---|---|
| Martens hardness (N/mm$^2$) | 8 | 12.8 | 18 |
| Elastic deformation power | 23% | 30% | 50% |

The present inventors presume the reason why the favorable toner releasability can be attained while keeping the excellent medium followability by setting the elastic deformation power ηIT and the Martens hardness within the foregoing ranges as follows.

In the nanoindentation test, the test load is set at 120 µN. The load is considered to be able to reproduce the load when the toner is pressed against the surface layer of the intermediate transfer member at the time of transfer. Incidentally, the deformation amount when the surface layer of the fluoro rubber is indented under the load is normally 1 µm or less.

Figure 6:
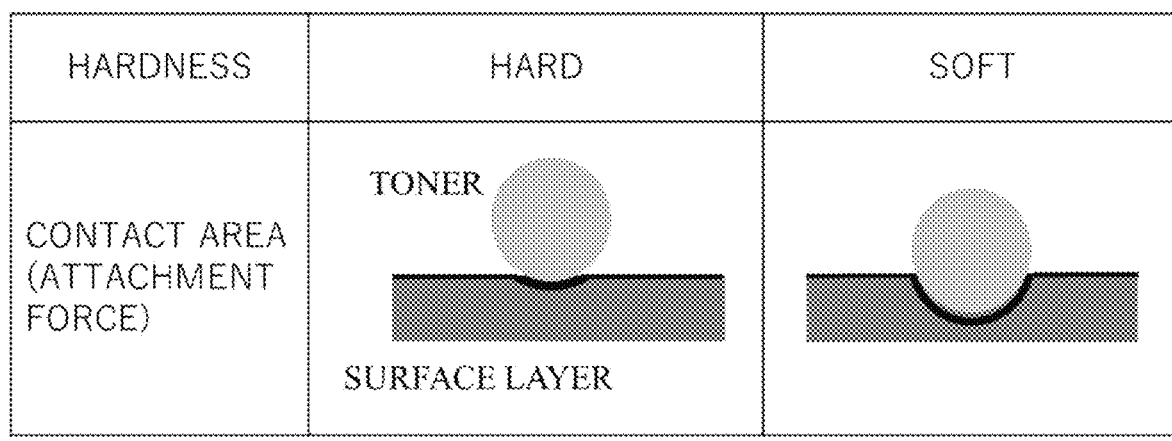
FIG. 6 is a view showing the relationship between the hardness of the electrophotographic member and the contact area thereof.

As shown in FIG. 6, the toner is pressed against the surface layer of the intermediate transfer member by the pressure of a transfer nip. At this step, the surface layer of the intermediate transfer member is deformed, and the contact area is determined according to the deformation amount. A large contact area results in an increase in the attachment force between the toner and the intermediate transfer member due to the intermolecular force or the electrostatic force. It is the Martens hardness that indicates the deformation amount upon applying a load. In other words, a higher Martens hardness results in a smaller deformation amount upon application with a load, and a smaller attachment force. When the Martens hardness is too low, inversely, the attachment force increases. Therefore, the Martens hardness is required to be 12.0 N/mm$^2$ or more. Further, by setting the Martens hardness at 18.0 N/mm$^2$ or less, it is also possible to keep the medium followability.

On the other hand, the intermediate transfer member transports and transfers the toner image while being rotatively driven. For this reason, at the transfer nip, a process in which unloading is performed after application with a load is performed as performed with nanoindentation measurement. The present inventors consider that the contact area in the unloading process also contributes to the attachment force between the toner and the intermediate transfer member. In other words, the deformed surface layer returns to the original shape without permanent deformation, resulting in the reduction of the attachment force. With the nanoindentation measurement, a large elastic deformation power indicates that the elasticity tends to be kept, and that recovery to the original shape tends to be caused. For this reason, it is considered that the surface layer with an elastic deformation power ηIT of 30% or more is effective for reducing the attachment force. On the other hand, from the viewpoint of the medium followability, the elastic deformation power ηIT is 50% or less.

As described up to this point, it can be considered that the elastic deformation power ηIT and the Martens hardness falling within the respective foregoing ranges enables the combination of the medium followability and the attachment force reduction.

The elastic deformation power ηIT is preferably 30 to 45%, and more preferably 35 to 40%.

Further, the Martens hardness is preferably 12.5 to 15.0 N/mm$^2$, and more preferably 13.0 to 14.0 N/mm$^2$.

The fluoro rubber is preferably a cured product of unvulcanized fluoro rubber composition including an unvulcanized fluoro rubber raw material and a curing agent. Namely, for example, the fluoro rubber is manufactured from a so-called basis and a curing agent. The methods for forming the surface layer 23 include a method in which the unvulcanized fluoro rubber composition is coated to a laminated body including the base layer 21 and the elastic layer 22 by spray coating or dip coating, and is cured by curing with heating or light irradiation of an ultraviolet light, or the like. The conditions for heating may be appropriately set according to the materials to be used, and have no particular restriction. Examples thereof may include 0.5 to 300 minutes at 120 to 280° C. Heating may be performed at a plurality of stages by varying the temperature.

The elastic deformation power ηIT and the Martens hardness can be controlled by, for example, the amount of the curing agent in the unvulcanized fluoro rubber composition. When the curing agent is mixed with the fluoro rubber raw materials with heating, both are bonded to each other. By adjusting the crosslinking agent amount, the crosslinking density is changed. For this reason, the surface layer hardness and the elastic deformation power can be controlled.

The relationship between the amount of the curing agent to be added and the elastic deformation power ηIT and the Martens hardness is as shown in Table 1.

The content of the curing agent in the unvulcanized fluoro rubber composition is preferably 7 to 12.5 parts by mass for every 100 parts by mass of the unvulcanized fluoro rubber raw materials.

The unvulcanized fluoro rubber raw material preferably includes a copolymer having a vinylidene fluoride structure, and an amine vulcanizing agent.

As the copolymer having a vinylidene fluoride structure, mention may be made of a vinylidene fluoride-hexafluoropropylene copolymer, a vinylidene fluoride-hexafluoropropylene-tetrafluoroethylene copolymer, or the like.

As the amine vulcanizing agents, mention may be made of aliphatic polyamines and a salt thereof such as hexamethylene diamine and hexamethylene diamine carbamate, aromatic polyamine such as phenylene diamine and xylylene diamine, and a salt thereof, and the like.

The fluoro rubber is preferably an amine vulcanizate of unvulcanized fluoro rubber. Namely, the curing agent included in the unvulcanized fluoro rubber composition is preferably at least an amine vulcanizing agent. Such fluoro rubber has at least one structure selected from the group consisting of the following formulae (1) and (2).

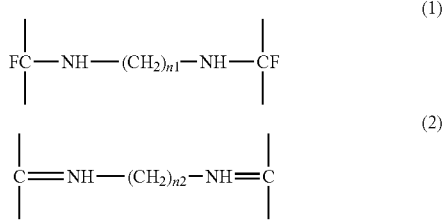

In the formulae, n1 and n2 each independently represent an integer of 1 or more (preferably 1 to 12).

As the combinations of the unvulcanized fluoro rubber paint and a curing agent capable of forming the preferable fluoro rubber, mention may be made of DAI-EL GLS-213CRR-A solution (manufactured by DAIKIN INDUSTRIES Ltd.) and DAI-EL GL-200R-B solution (manufactured by DAIKIN INDUSTRIES Ltd.) (both are trade names).

The thickness of the surface layer is 3 μm or more. When the thickness of the surface layer is smaller than 3 μm, the flexibility of the elastic layer is affected when a toner is pressed at the transfer nip. For this reason, even when the amount of the curing agent to be added is increased to increase the surface layer hardness, it is difficult to obtain a desirable Martens hardness.

The thickness of the surface layer is preferably 3 to 30 μm, more preferably 3 to 15 μm, and further preferably 4 to 10 μm. From the viewpoint of making the medium followability better, the foregoing range is preferable. The thickness of the surface layer is preferably small enough for the thickness of the elastic layer.

To such an extent not to impair the effects of the present disclosure, the surface layer may include additives such as a filler, a scorch retarder, an antioxidant, a softener, a heat stabilizer, a flame retardant, a flame retardant auxiliary, an ultraviolet absorber, and a rust inhibitor.

Image Forming Apparatus

An image forming apparatus includes, for example, the electrophotographic member as the intermediate transfer member. The example of the image forming apparatus using the elastic intermediate transfer belt as the intermediate transfer member will be described by reference to FIG. 1.

Figure 1:
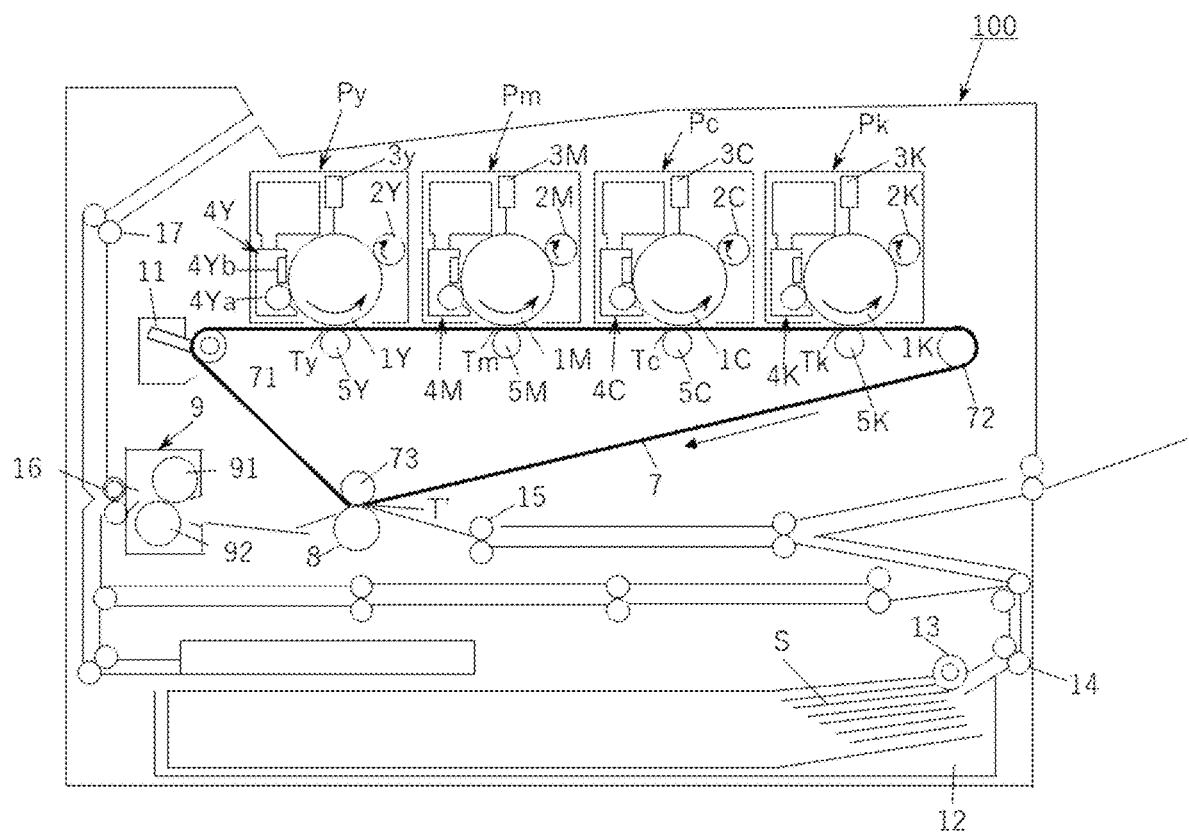
FIG. 1 is a cross sectional view showing one example of an electrophotographic image forming apparatus.

An electrophotographic image forming apparatus 100 of FIG. 1 is a color electrophotographic image forming apparatus (color laser printer). The electrophotographic image forming apparatus 100 includes an intermediate transfer member in accordance with one aspect of the present disclosure as an intermediate transfer belt 7. Then, image forming units Py, Pm, Pc, and Pk of respective colors of yellow (Y), magenta (M), cyan (C), and black (K) are arranged sequentially in the direction of movement along the flat portion of the intermediate transfer belt 7 of the intermediate transfer member.

Here, 1Y, 1M, 1C, and 1K are respective electrophotographic photosensitive members, 2Y, 2M, 2C and 2K are respective charging rollers; 3Y, 3M, 3C and 3K are respective laser exposure devices; 4Y, 4M, 4C and 4K are respective developing devices, and 5Y, 5M, 5C, and 5K are respective primary transfer rollers. Since the image forming units Py, Pm, Pc, and Pk have the same basic configuration, the details of the image forming unit will be explained by referring only to the yellow image forming unit Py.

The yellow image forming unit Py has the drum-type electrophotographic photosensitive member (hereinafter also referred to as "photosensitive drum" or "first image bearing member") 1Y as an image bearing member. The photosensitive drum 1Y is formed by using an aluminum cylinder as a substrate and laminating a charge generating layer, a charge transport layer and a surface protection layer in this order thereon.

Also, the yellow image forming unit Py is equipped with the charging roller 2Y as charging means. By applying a charging bias to the charging roller 2Y, the surface of the photosensitive drum 1Y is uniformly charged.

A laser exposure device 3Y as image exposure means is arranged above the photosensitive drum 1Y. The laser exposure device 3Y scans and exposes the uniformly charged surface of the photosensitive drum 1Y according to image information to form an electrostatic latent image of the yellow color component on the surface of the photosensitive drum 1Y.

The electrostatic latent image formed on the photosensitive drum 1Y is developed with toner, which is a developer, by the developing device 4Y as developing means. That is, the developing device 4Y includes a developing roller 4Ya as a developer carrying member and a regulating blade 4Yb as a developer amount regulating member, and contains yellow toner as the developer.

The developing roller 4Ya supplied with yellow toner is in light pressure contact with the photosensitive drum 1Y in the developing section, and is rotated in the forward direction with a speed difference from the photosensitive drum 1Y. The yellow toner conveyed to the developing section by the developing roller 4Ya adheres to the electrostatic latent image formed on the photosensitive drum 1Y as a result of applying a developing bias to the developing roller 4Ya. A visible image (yellow toner image) is thus formed on the photosensitive drum 1Y.

The intermediate transfer belt 7 is stretched around a drive roller 71, a tension roller 72, and a driven roller 73, and is moved (rotated) in the direction of the arrow in the drawing while being in contact with the photosensitive drum 1Y.

The yellow toner image formed on the photosensitive drum 1Y (on the first image bearing member) that has reached the primary transfer section Ty is primarily transferred onto the intermediate transfer belt 7 by a primary transfer member (primary transfer roller 5Y) arranged to face the photosensitive drum 1Y with the intermediate transfer belt 7 interposed therebetween.

Similarly, the image forming operation described above is performed in each of the magenta (M), cyan (C), and black (K) image forming units Pm, Pc, and Pk along with the movement of the intermediate transfer belt 7. Toner images of four colors of yellow, magenta, cyan, and black are superimposed on the intermediate transfer belt 7.

The four-color toner layers are transported along with the movement of the intermediate transfer belt 7 and are collectively transferred onto a transfer material S (hereinafter also referred to as a "second image bearing member"), which is transported at a predetermined timing, by a secondary transfer roller 8 as secondary transfer means at a secondary transfer section T'. In such secondary transfer, a transfer voltage of several kV is normally applied in order to ensure a sufficient transfer rate.

The transfer material S is supplied from a cassette 12 in which the transfer material S is accommodated to the transport path by a pickup roller 13. The transfer material S supplied to the transport path is transported to the secondary transfer section T' in synchronization with the four-color toner image transferred onto the intermediate transfer belt 7 by a transport roller pair 14 and a registration roller pair 15.

The toner image transferred to the transfer material S is fixed by a fixing device 9 to become, for example, a full-color image. The fixing device 9 has a fixing roller 91 provided with a heating means and a pressure roller 92, and fixes the unfixed toner image on the transfer material S by heating and pressurizing the image. After that, the transfer material S is discharged out of the apparatus by a pair of transport rollers 16, a pair of discharge rollers 17, and the like.

A cleaning unit 11 for the intermediate transfer belt 7 is disposed downstream of the secondary transfer section T' in the driving direction of the intermediate transfer belt 7, and removes the untransferred toner, which was not transferred onto the transfer material S at the secondary transfer portion T' and remained on the intermediate transfer belt 7.

The process of electrically transferring, as described above, the toner image from the photosensitive member 1 to the intermediate transfer belt 7 and from the intermediate transfer belt 7 to the transfer material S is performed repeatedly. Further, by repeating recording on a large number of transfer materials S, the electrical transfer process is further performed repeatedly.

EXAMPLES

Below, the present disclosure will be specifically described by way of Examples. Incidentally, the present disclosure is not limited to the following Examples.

Hardness by Nanoindentation Method and Evaluation Method of Elastic Deformation Workload)

With the method for measuring the Martens hardness and the elastic deformation power ηIT with the nanoindentation method can be performed in the following manner, calculation can be performed from the load-displacement curve obtained according to the procedure of the indenting test prescribed by ISO 14577 by means of a commercially available device according to ISO 14577. In the present disclosure, a nanoindenter device (trade name: PICODENTOR HM500, manufactured by FISCHER Co.) according to the ISO standard was used. The measurement conditions are as follows.

Measurement environment: 23° C., relative humidity 40%
Indenter: Vickers indenter
Measurement load: 120 μN From the resulting load-displacement curve, the elastic deformation power ηIT and the Martens hardness were calculated with respective arithmetic average values measured at 9 points at a given place of the surface layer.

Incidentally, the Martens hardness is the hardness to be measured with a test load applied thereto, and is determined from the load displacement curve. The value after reaching to the measurement load is used. The Martens hardness includes both the components of the plastic and elastic deformation. The Martens hardness is defined as the value obtained by dividing the measurement load P by the surface area A of penetration of an indenter, and is determined by the following equation.

$$\text{Martens hardness } HM = P/A$$

On the other side, the elastic deformation power represents the proportion of the component of elastic deformation in the total workload including both the components of the plastic deformation and the elastic deformation, and is determined by the following equation.

$$\text{Elastic deformation power} = 1 - \text{plastic deformation power/total workload}$$

Evaluation Method of Thickness

The thickness of the elastic layer, and the thickness of the surface layer stacked on the elastic layer were calculated in the following manner. Using a cross section polisher, the cross section perpendicular to the surface is manufactured. Subsequently, the manufactured cross section is observed by means of a scanning electron microscope. Specifically, with a cross section polisher (trade name: SM-09010, manufactured by JEOL Ltd.), using an acceleration voltage of 4 kV, a current value of 70 μA, and an argon gas, a cross section perpendicular to the surface of the intermediate transfer member was manufactured over 15 hours. Subsequently, the cross section was observed at given 3 points at an acceleration voltage of 3 kV, and a magnification of 1,500 times by means of a scanning electron microscope (trade name: XL-300-SFEG, manufactured by FEI). The thicknesses were calculated from the obtained image data, and the average value thereof was assumed to be the thickness of each layer to be evaluated.

Example 1

Manufacturing of Intermediate Transfer Belt
Base Layer

As the base layer, an endless belt made of polyimide with an internal diameter of 370 mm, a width of 370 mm, and a thickness of 80 μm was prepared.

Primer Layer

Onto the outer circumferential surface of the base layer, a primer (trade name: DY39-051A/B; manufactured by Toray Dow Corning Co., Ltd.) was coated substantially uniformly so as to achieve a dry weight of 60 mg, and the solvent was dried. Then, a baking treatment was performed in an electric furnace set at 160° C. for 40 minutes.

Manufacturing of Liquid Silicone Rubber Mixture Solution for Elastic Layer

As the conductive agent, an ion liquid type antistatic agent (trade name: FC-4400, manufactured by 3M Japan Co.) was used.

The conductive agent was added in a ratio of 0.2 part by mass with respect to 100 parts by mass of addition curable liquid silicone rubber (trade name: TSE3032 A/B (weight ratio A1000:B8), manufactured by Momentive Performance Materials Co.), thereby manufacturing a mixture 1.

Then, the one obtained by dissolving 0.2 part by mass of 1-ethynyl-1-cyclohexanol (manufactured by Tokyo Chemical Industry Co., Ltd.) of a curing retardant in toluene in the same amount of mass was added into the mixture 1, resulting in a mixture 2.

Then, 0.1 part by mass of a hydrosilylation catalyst (platinum catalyst: a mixture of a 1,3-divinyl tetramethyl disiloxane platinum complex, 1,3-divinyl tetramethyl disiloxane, and 2-propanol) was added to the mixture 2, resulting in a mixture 3.

Further, as a crosslinking agent, 1.5 parts by mass of a silicone polymer having an active hydrogen group bonded with silicon only the side chain (trade name: HMS-301, manufactured by Gelest Co.) was weighed. This was added to the mixture 3, and the resulting mixture was sufficiently mixed, and stirred/deaerated by mean of a stirring deaeration device (trade name: HM-500, manufactured by KEYENCE Co.), resulting in a liquid silicone rubber mixture solution.

Formation of Laminated Body of Base Layer and Elastic Layer

Subsequently, a polyimide belt serving as the base layer was attached to the cylindrical core, and further, a ring nozzle for discharging rubber was attached coaxially onto the core. Using a feeding pump, the liquid silicone rubber mixture solution was supplied to the ring nozzle, and was discharged through a slit, thereby coating the mixture solution on the base material. At this step, the relative moving speed and the feeding pump discharge amount were adjusted so that the elastic layer after curing may have a thickness of 260 μm. The belt was placed in a heating furnace while being attached to the core, and was heated at 180° C. for 10 minutes, thereby performing rubber crosslinking. After cooling, the belt was removed from the core, resulting in a belt including the elastic layer stacked thereon.

Surface Modification of Elastic Layer

In order to improve the adhesion between the elastic layer and the surface layer, the surface modification of the elastic layer was performed using an excimer lamp for emitting a 172-nm single wavelength (manufactured by M. D. COM. INC.) as an excimer UV irradiation unit. A two-layer belt of the base layer-elastic layer was fitted to the cylindrical core. While rotating the core at a rotation speed of 5 rpm from a distance of 1 mm from the excimer lamp surface, irradiation was performed in the space where a nitrogen gas had flowed for 30 minutes.

The micro rubber hardness of the elastic layer was 78°.

Preparation of Paint for Forming Surface Layer

A curing agent (trade name: DAI-EL GL-200R-B solution, manufactured by DAIKIN INDUSTRIES Ltd.) was added in an amount of 7 parts by mass with respect to 100 parts by mass of an unvulcanized fluoro rubber paint (trade name: DAI-EL GLS-213CRR-A solution, manufactured by DAIKIN INDUSTRIES Ltd.) as the raw material for fluoro rubber, thereby preparing a paint for forming the surface layer (unvulcanized fluoro rubber composition).

Formation of Surface Layer

Subsequently, a belt serving as the laminated body of the base layer and the elastic layer was attached to the cylindrical core. The paint for forming the surface layer was spray coated so that the thickness may become 7 μm after drying, and was dried at 60° C. for 10 minutes. Then, the paint was cross linking cured at 200° C. for 20 minutes in a hot air circulating furnace, resulting in an intermediate transfer member of Example 1.

Adjustment of Hardness of Surface Layer

Figure 3:
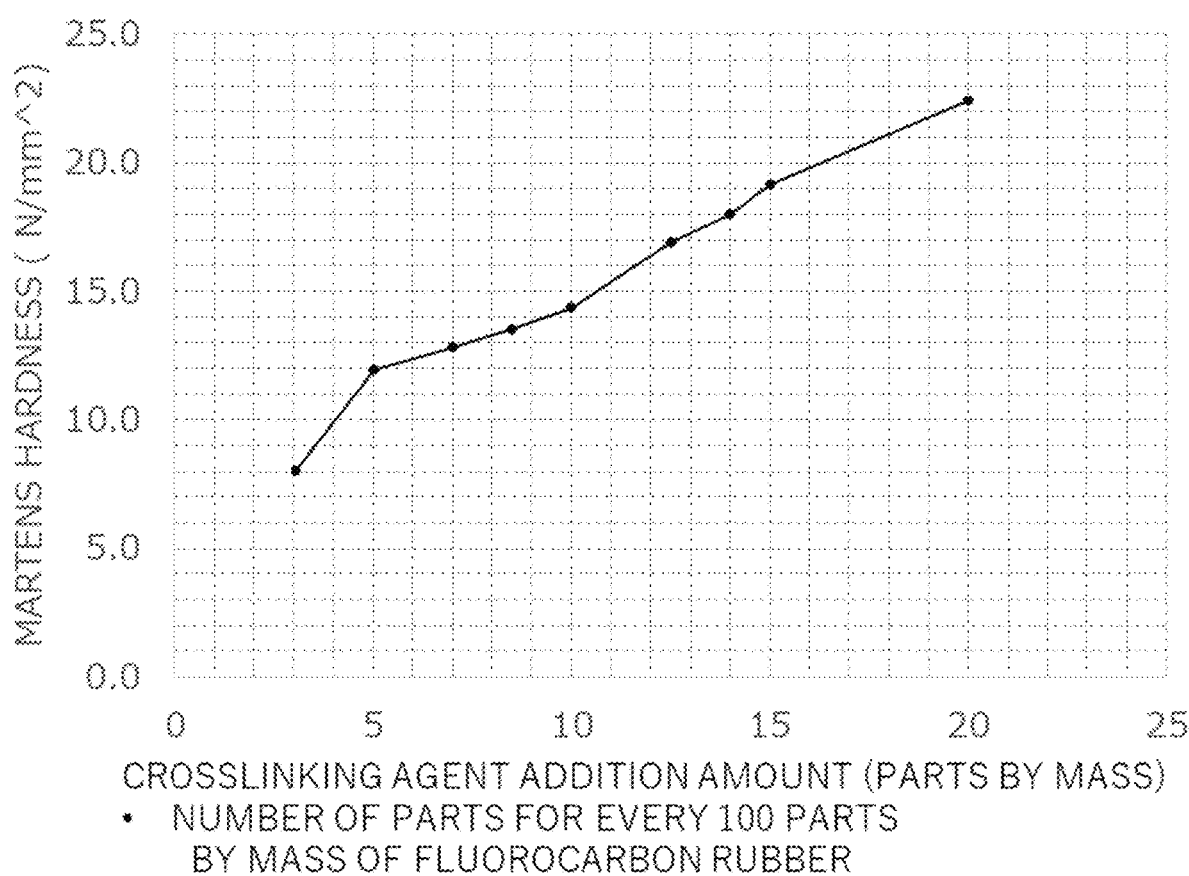
FIG. 3 is a graph showing the relationship between the amount of a curing agent to be added and the Martens hardness.

FIG. 3 shows the results of measurement of the hardness of the surface layer obtained by each surface layer forming paint when the content of the curing agent included in the surface layer forming paint is changed with the nanoindentation method. The horizontal axis of FIG. 3 shows the amount of the curing agent to be added for every 100 parts by mass of the unvulcanized fluoro rubber paint. The results indicate that the hardness can be controlled by the amount of the curing agent to be added.

In the following Examples, each intermediate transfer member is obtained in the same manner as in Example 1, except that the hardness of the surface layer is changed by changing the amount of the curing agent to be added in preparation of the surface layer paint.

Examples 2 and 3

Each intermediate transfer member of Examples 2 and 3 was obtained in the same manner as in Example 1, except that the amount of the curing agent to be added was set at the amount in terms of part by mass described in Table 2. Each intermediate transfer member of Examples 2 and 3 had a surface layer with a higher hardness than that of Example 1.

Example 4

An intermediate transfer member of Example 4 was obtained in the same manner as in Example 2, except that the thickness of the elastic layer was set at 100 μm.

Example 5

An intermediate transfer member of Example 5 was obtained in the same manner as in Example 3, except that the thickness of the surface layer was set at 30 μm.

Comparative Example 1

An intermediate transfer member of Comparative Example 1 was obtained in the same manner as in Example 1, except that the amount of the curing agent to be added was set at 3 parts by mass in preparation of the surface layer paint.

Comparative Example 2

An intermediate transfer member of Comparative Example 2 was obtained in the same manner as in Example 1, except that the amount of the curing agent to be added was set at 20 parts by mass in preparation of the surface layer paint.

Comparative Example 3

An intermediate transfer member of Comparative Example 3 was obtained in the same manner as in Example 1, except that the elastic layer was set as semi-conducting chloroprene rubber, and that the micro rubber hardness was set at 90°.

Evaluation Results

Table 2 shows the addition amounts of the unvulcanized fluoro rubber paints for surface layer and the curing agents used in Examples 1 to 3 and Comparative Examples 1 to 5, and the evaluation results thereof. With respective evaluation methods, the Martens hardness and the elastic deformation power ηIT are shown as the measurement results with the nanoindentation method. The evaluation methods of the attachment force and the density uniformity will be described below.

Figure 4:
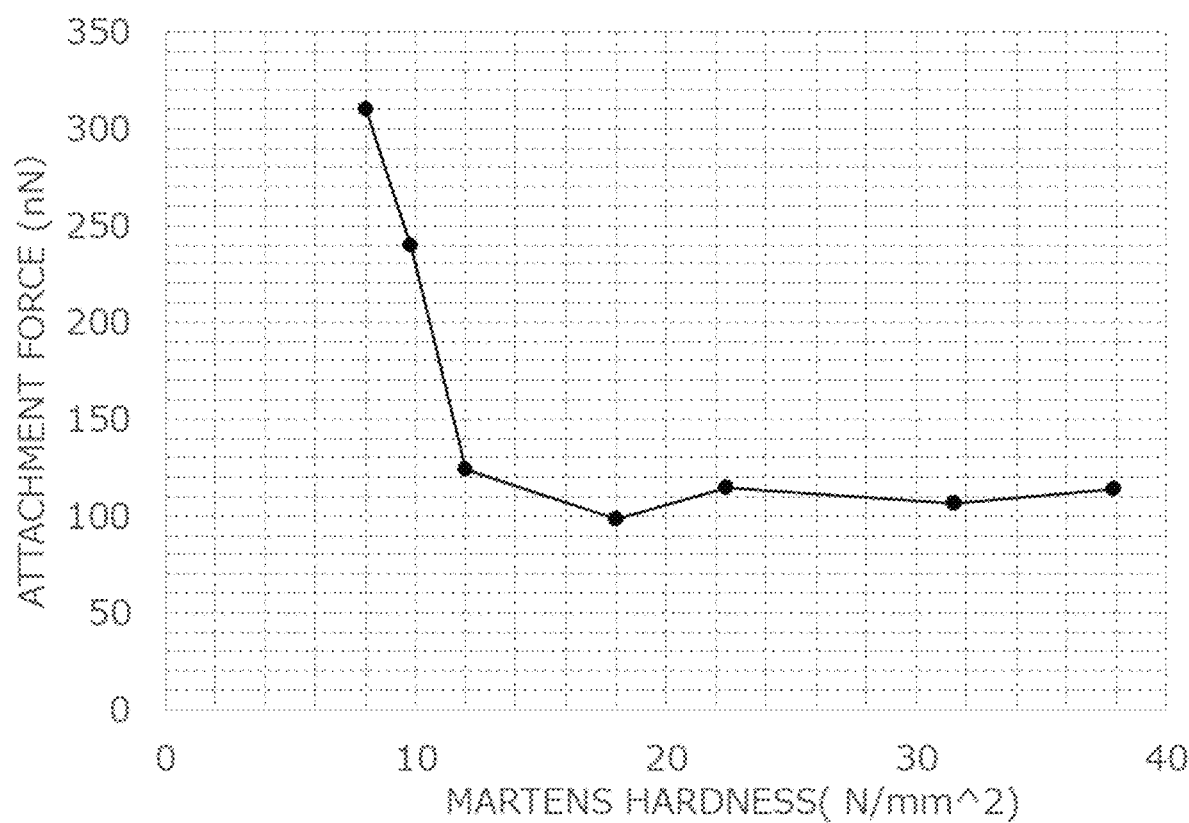
FIG. 4 is a graph showing the relationship between the Martens hardness and the attachment force.

Measurement mode: AFM
Cantilever tip material: polystyrene (spherical) CP-NCH-PS-C-5
Sphere diameter: 6.1 μm
Spring constant: 42 N/m
Length: 125 μm
Indentation load: 1000 nN FIG. 4 shows the relationship between the Martens hardness and the attachment force measured by varying a Martens hardness of the surface layer. It can be observed that the attachment force tends to decrease with an increase in hardness in the low hardness region. Further, it is indicated that in the case of a Martens hardness of 12.0 N/mm$^2$ or more, the phenomenon of a decrease in the attachment force tends to be saturated. The decrease in the attachment force can be considered to be caused by the following: when the surface layer becomes harder, the contact area with the surface layer decreases.

Evaluation of Density Uniformity

The evaluation of the density uniformity was carried out by mounting an intermediate transfer member on a full color electrophotographic image forming apparatus (trade name: image PRESS C800, manufactured by CANON Inc.).

Under environment of a temperature of 25° C. and a relative humidity of 55%, a whole secondary color solid

TABLE 2

| Example No. | Elastic layer material | Elastic layer thickness μm | Fluoro rubber paint (part by mass) | Curing agent (part by mass) | Martens hardness N/mm$^2$ | Surface layer thickness μm | Elastic deformation power ηIT | AF (nN) | Density uniformity |
|---|---|---|---|---|---|---|---|---|---|
| 1 | Silicone rubber | 260 | 100 | 7 | 12.8 | 7 | 30% | 124 | A |
| 2 | Silicone rubber | 260 | 100 | 9 | 13.7 | 7 | 38% | 120 | A |
| 3 | Silicone rubber | 260 | 100 | 14 | 18.0 | 7 | 45% | 100 | A |
| 4 | Silicone rubber | 100 | 100 | 9 | 13.7 | 7 | 38% | 120 | B |
| 5 | Silicone rubber | 260 | 100 | 14 | 18.0 | 30 | 45% | 100 | B |
| C.E. 1 | Silicone rubber | 260 | 100 | 3 | 8.0 | 7 | 20% | 310 | D |
| C.E. 2 | Silicone rubber | 260 | 100 | 20 | 22.4 | 7 | 58% | 115 | C |
| C.E. 3 | Chloroprene rubber | 260 | 100 | 9 | 13.7 | 7 | 38% | 120 | D |

In the Table, "C.E" indicates "Comparative Example", and "AF" indicates "Attachment force".

Evaluation of Attachment Force

Figure 5:
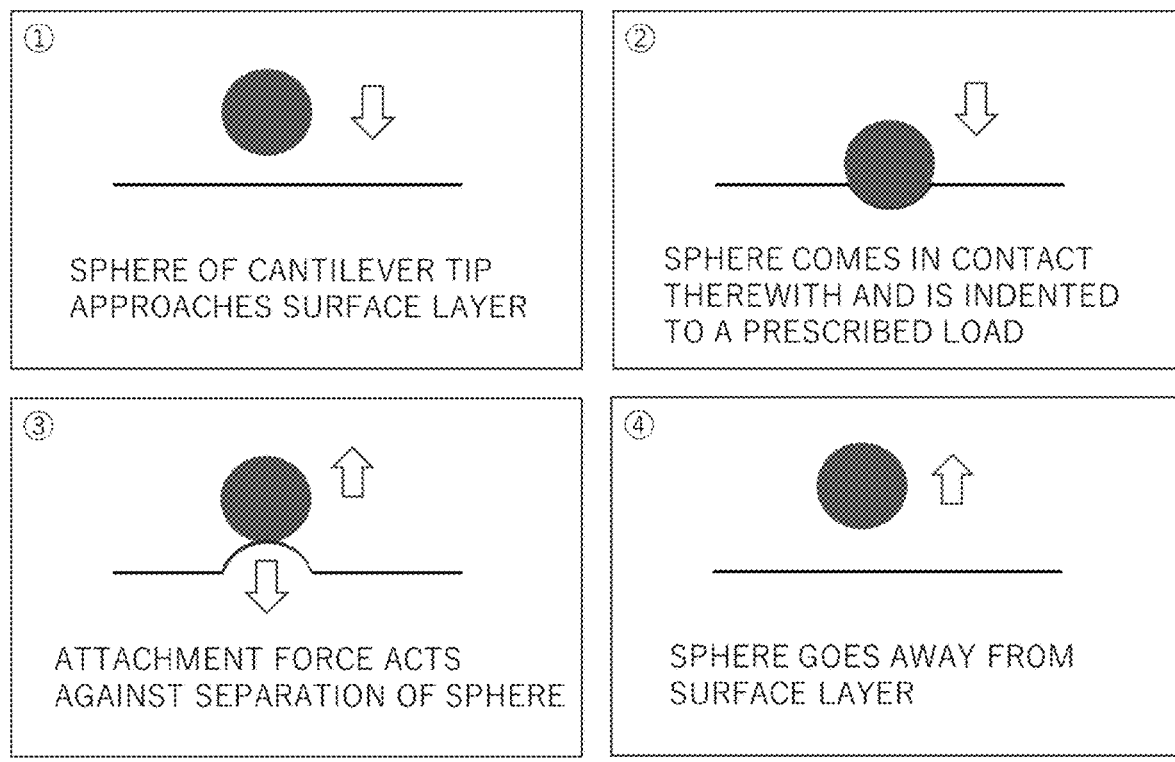
FIG. 5 is an image of attachment force measurement.

The evaluation of the attachment force was performed using an atomic force microscope (trade name: SPI-4000, Hitachi High-Tech Science Corporation). FIG. 5 shows an image of attachment force measurement.

(1) A cantilever including a sphere at the tip is brought closer to the surface layer.
(2) The load and the displacement amount upon bringing the sphere of the cantilever into contact with the surface layer, and indenting the sphere under a small load are measured.
(3) For unloading, the sphere is attracted to the surface layer by the attachment force, and hence a negative load is outputted. The maximum value of the absolute value is assumed to be the attachment force.

In the present evaluation, the measurement was performed under the conditions shown below.

image of cyan and magenta was formed on an A3-sized embossed paper (trade name: LEATHAC 66 250 g/m$^2$, manufactured by Tokushu Tokai Paper Co., Ltd.), and was evaluated by the following criteria.

Rank A: image unevenness is not observed at all, and hence favorable
Rank B: slight image unevenness is observed at a part of the embossed paper depressed portion
Rank C: image unevenness is observed in a region of about 20% of the embossed paper depressed portion
Rank D: image unevenness is observed over the half or more of the embossed paper depressed portion Examples 1 to 5 were confirmed to be higher in density uniformity relative to Comparative Examples 1, 2, and 3. This is considered due to the following. By setting the Martens hardness of the surface layer at 12.0 to 18.0 N/mm$^2$, and the elastic deformation power ηIT at 30 to 50%, it was possible to provide sufficient followability to the medium, and to reduce the attachment force between the toner and the surface layer.

The surface layer of Comparative Example 1 is too low in the Martens hardness, and hence is high in the attachment force. On the other hand, it is considered as follows. Comparative Example 2 is too large in the Martens hardness and the elastic deformation power ηIT of the surface layer, and hence is low in the followability to the medium, resulting in the reduction of the density uniformity.

Comparative Example 3 is considered as follows. The elastic layer does not include silicone rubber, and is low in the flexibility, and hence the medium followability is reduced, and the density uniformity is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-032913, filed Mar. 3, 2023, which is hereby incorporated by reference herein in its entirety.

What is claimed is:

1. An electrophotographic member comprising:
a base material;
an elastic layer on the base material; and
a surface layer on the elastic layer, wherein
the elastic layer comprises silicone rubber,
the surface layer comprises fluoro rubber,
a thickness of the surface layer is 3 μm or more,
an elastic deformation power ηIT calculated from a load displacement curve, obtained with a nanoindentation test according to ISO 14577 by bringing a Vickers indenter into contact with an outer surface of the surface layer and setting a test load at 120 μN, is 30 to 50%, and
a Martens hardness determined by the nanoindentation test at the outer surface of the surface layer is 12.0 to 18.0 N/mm$^2$.

2. The electrophotographic member according to claim 1, wherein
a micro rubber hardness upon measuring the elastic layer by a press needle of type C is 70 to 85°.

3. The electrophotographic member according to claim 1, wherein
the fluoro rubber is an amine vulcanizate of unvulcanized fluoro rubber.

4. The electrophotographic member according to claim 1, wherein
the fluoro rubber has at least one structure selected from the group consisting of formulae (1) and (2) below:

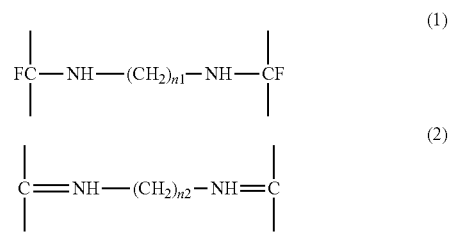

where n1 and n2 each independently represent an integer of 1 or more.

5. The electrophotographic member according to claim 1, wherein
a thickness of the elastic layer is 200 to 450 μm.

6. The electrophotographic member according to claim 1, wherein
the elastic deformation power ηIT is 35 to 40%, and
the Martens hardness is 13.0 to 14.0 N/mm$^2$.

7. The electrophotographic member according to claim 1, wherein
the electrophotographic member is an intermediate transfer member.

8. The electrophotographic member according to claim 1, wherein
the electrophotographic member has an endless belt shape.

9. An electrophotographic image forming apparatus comprising an electrophotographic member, wherein
the electrophotographic member comprising:
a base material;
an elastic layer on the base material; and
a surface layer on the elastic layer, wherein
the elastic layer comprises silicone rubber,
the surface layer comprises fluoro rubber,
a thickness of the surface layer is 3 μm or more,
an elastic deformation power ηIT calculated from a load displacement curve, obtained with a nanoindentation test according to ISO 14577 by bringing a Vickers indenter into contact with an outer surface of the surface layer and setting a test load at 120 μN, is 30 to 50%, and
a Martens hardness determined by the nanoindentation test at the outer surface of the surface layer is 12.0 to 18.0 N/mm$^2$.

10. The electrophotographic image forming apparatus according to claim 9, comprising the electrophotographic member as an intermediate transfer member.

* * * * *